United States Patent [19]

Dumortier et al.

[11] Patent Number: 5,749,559
[45] Date of Patent: May 12, 1998

[54] DEVICE FOR CONTROLLING A SPACECRAFT BY GATING GAS VIA A MOVING NOZZLE

[75] Inventors: André Dumortier, Merignac; Jean-Gabriel Faget, Bordeaux, both of France

[73] Assignee: Societe Europeene de Propulsion, Suresnes, France

[21] Appl. No.: 732,704

[22] Filed: Oct. 18, 1996

[30] Foreign Application Priority Data

Oct. 20, 1995 [FR] France ................... 95 12362

[51] Int. Cl.[6] .......................... F16K 31/40; F16K 31/383
[52] U.S. Cl. .................... 251/30.03; 239/265.19; 239/579; 251/30.05; 251/33; 251/63; 251/155
[58] Field of Search ................. 239/265.19, 579; 251/30.03, 30.05, 33, 63, 155

[56] References Cited

U.S. PATENT DOCUMENTS

| 3,192,710 | 7/1965 | Wilson | 239/265.33 |
|---|---|---|---|
| 3,979,088 | 9/1976 | McCormick | |
| 4,777,795 | 10/1988 | Lecorre et al. | 60/234 |
| 4,826,104 | 5/1989 | Bennett et al. | 239/265.19 X |

FOREIGN PATENT DOCUMENTS

| 0238369 | 9/1987 | European Pat. Off. |
| 1273933 | 9/1961 | France |
| 758785 | 10/1956 | United Kingdom |
| 1480723 | 7/1977 | United Kingdom |

OTHER PUBLICATIONS

"Development and Testing of Carbon/Carbon Valves and Tubes for Hot Gas Flow Control", J.F. Sevellec, AIAA/SAE/ASME/ASEE 23rd Joint Propulsion Conference, Jun. 29, 1987–Jul. 2, 1987, San Diego, California, pp. 1–8.

*Primary Examiner*—Gerald A. Michalsky
*Attorney, Agent, or Firm*—Weingarten, Schurgin, Gagnebin & Hayes LLP

[57] ABSTRACT

A device for controlling a spacecraft by gating gas, the device comprising a nozzle, a gas feed duct, a gate having a seat and a plunger interposed between the feed duct and the nozzle, and control means for opening and closing the gate in order to put the feed duct selectively into communication with the nozzle. The seat of the gate is secured to the nozzle and the nozzle is movable such that the gate is opened and closed by displacement of the nozzle, which displacement is driven directly by the hot gas, without calling on an auxiliary fluid.

3 Claims, 1 Drawing Sheet

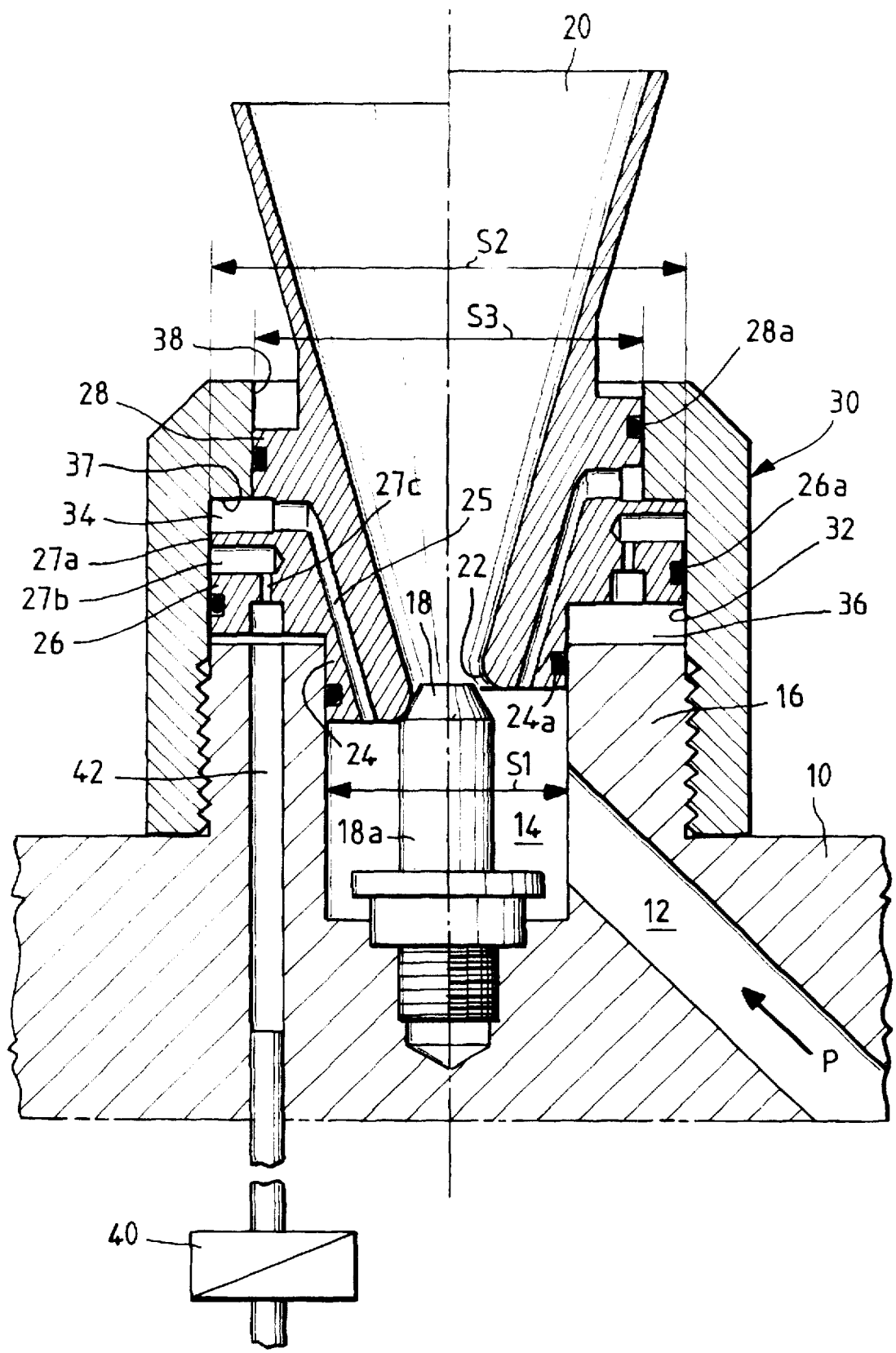

DEVICE FOR CONTROLLING A SPACECRAFT BY GATING GAS VIA A MOVING NOZZLE

The present invention relates to controlling the attitude of space vehicles by gating gas, and more particularly to a device of the type comprising a nozzle, a gas feed duct, a gate having a seat and a plunger interposed between the feed duct and the nozzle, and means for opening or closing the gate in order to put the nozzle selectively into communication with the feed duct.

BACKGROUND OF THE INVENTION

It is well known to control the trajectory of the spacecraft by selectively controlling the ejection of gas to control nozzles distributed over the body of the spacecraft. The gas is generally hot gas produced by a solid propellant gas generator.

Usually, the ejection of gas through each nozzle is controlled by a main gate having a plunger that moves relative to a fixed seat. The plunger is driven by an actuator, e.g. electrically, electropneumatically, or hydraulically.

The precision required for controlling the spacecraft imposes very short reaction time, and thus actuators that are relatively powerful, given the pressure of the gas. In addition, the gas is at a very high temperature, in particular when the generator has high specific impulse, and that requires the actuator to be effectively isolated from the gas. Consequently, it is necessary to use a plunger provided with a control rod that is strong enough to transmit the force produced by the actuator and long enough to isolate the actuator thermally from the plunger.

This gives rise to an architecture that is complex and to relatively large bulk for the gate control system, even when thermostructural composite materials are used such as carbon-carbon composite materials for the plunger and its control rod, as recommended in the article by J. F. Sevellec entitled "Development and testing of carbon-carbon valves and tubings for hot gas flow control", AIAA/SAE/ASME/ASEE 23rd Joint Propulsion Conference, Jun. 26–Jul. 2, 1987, San Diego, Calif.

Unfortunately, it is desirable that gas gating systems for spacecraft control be as simple and as compact as possible for reasons of reliability and to limit the size and the mass of onboard equipment, while nevertheless achieving very short response times.

OBJECTS AND SUMMARY OF THE INVENTION

According to the invention, this is achieved by the fact that the seat of the gate is secured to the nozzle and the nozzle is movable relative to the plunger such that opening and closing of the gate are controlled by displacement of the nozzle, and by the fact that the nozzle is displaced directly under drive from the hot gas conveyed by the nozzle.

The invention is thus remarkable in that the flow section for the gas is controlled by moving the nozzle and not the plunger, the plunger being fixed. This eliminates problems of transmitting actuator forces to the plunger and of isolating the actuator from the hot gas.

Also, nozzle movement is controlled directly by the hot gases without requiring an auxiliary fluid. To this end, the nozzle may be secured to a piston which slides in a cylinder and which subdivides the inside volume thereof into a first chamber permanently connected to the feed duct and a second chamber which communicates with the first and into which there opens out an exhaust duct that is itself connected to a pilot valve. The pilot valve is controlled by an actuator which may be much smaller in size than that used in the prior art for controlling the main gate. In addition, the gas reaching the pilot valve via the exhaust duct is at a temperature that is lower than that of the gas on leaving the feed duct.

As a result, the system for controlling hot gas gating can be smaller and can require less power, thereby contributing to greater overall compactness without harming effectiveness since it is the hot gas which acts directly on the gate.

BRIEF DESCRIPTION OF THE DRAWING

The invention will be better understood on reading the following description given by way of non-limiting indication and made with reference to the accompanying drawing in which the sole FIGURE is a section view of an embodiment of a gas gating device of the invention, the gate being shown in its closed position in the left half-section of the FIGURE and in its open position in the other half-section.

MORE DETAILED DESCRIPTION

In this FIGURE, reference 10 designates a base secured to the body of a spacecraft to be controlled and on which a gating device is mounted for gating hot gas coming from a gas generator (not shown) via a feed duct 12 passing through the base 10. The duct 12 opens out to the inside of a chamber 14 from which the gas can be selectively ejected through a nozzle 20. The chamber 14 is defined in part by a tubular portion 16 projecting from the base 10.

A plurality of similar devices subjected to individual on/off control are mounted around the body of the spacecraft so as to control the attitude thereof.

Communication between the chamber 14 and the nozzle 20 is opened and closed by controlling the spacing between a plunger 18 and a seat 22 or by bringing them into mutual contact.

The plunger 18 is situated at the end of a rod 18a extending axially in the chamber 14 and screwed to the bottom thereof, so that the plunger is fixed relative to the base 10.

The seat 22 is formed at the end of a tubular portion extending the nozzle 20 upstream relative to the direction in which gas flows through the diverging portion of the nozzle. Going downstream from the upstream end, the tubular portion has a first annular portion 24, a second annular portion 26 of outside diameter greater than that of the portion 24, and a third annular portion 28 of diameter smaller than that of the portion 26. The seat 22 is formed around the central passage of the annular portion 24 and at the end thereof, the portion 24 being capable of sliding in sealed manner in the chamber 14, there being an annular sealing gasket 24a interposed between them.

Ejection or non-ejection of hot gas through the nozzle 20 is controlled by moving the nozzle so as to move the seat 22 away from the plunger 18 or so as to press thereagainst. The nozzle is controlled directly by the hot gases conveyed by the nozzle in the manner of a free piston electropneumatic valve.

Thus, an annular sleeve 30 is screwed on the tubular portion 16 of the base 10 so as to define a cylinder 32 in which the annular portion 26 of the nozzle 20 can slide and form a piston which subdivides the inside volume of the cylinder 32 into a first chamber 34 and a second chamber 36.

In its end portion 38 remote from the base 10, the sleeve 30 has an inside section that is smaller than the section of the cylinder 32 such that the annular portion 28 can slide therein without clearance, there being an annular sealing gasket 28a interposed between them. The inside walls of the cylinder 32 and of the end portion 38 of the sleeve are connected to each other via a shoulder 37.

In this way, the three portions 24, 26, and 28 of the nozzle slide in cylindrical portions 14, 32, 38 of corresponding respective diameters, with the internal sections S1, S2, and S3 of the chamber 14, the cylinder 32, and the portion 38 being such that S2>S1 and S2>S3.

Passages 25 formed in the nozzle body 20 put the chamber 14 permanently into communication with the chamber 34 such that said chamber is constantly pressurized to the pressure P of the hot gas. It will be observed that the gasket 28a isolates the chamber 34 from the outside.

The piston 26 is provided with an annular sealing gasket 26a pressed against the wall of the cylinder 32. Nevertheless, communication having a leakage or small flow section is established between the chamber 34 and the chamber 36. In the example shown, this communication passes via a leakage section 27a between the cylinder 32 and the downstream portion of the piston 26 adjacent to the cylinder 34, via three blind radial holes 27b formed in said downstream portion of the piston extending from its peripheral surface, and via longitudinal holes 27c putting the holes 27b into communication with the chamber 36.

The chamber 36 is isolated from the chamber 14 by the gasket 24a, but it communicates with a pilot valve 40 via an exhaust duct 42 passing through the base 10. The valve 40 may be an electromagnetically controlled valve, for example.

The position shown in the right half-section of the FIGURE corresponds to the pilot valve 40 being closed. The chamber 36 is pressurized to the pressure P of the hot gas because of the communication established with the chamber 34. Since the surface area of the piston 26 exposed to the pressure P in the chamber 36 is greater than that exposed to the same pressure in the chamber 34, the piston 26 is in its downstream position in abutment against the shoulder 37. The valve seat 22 is at a distance from the plunger 18 such that the hot gas coming from the feed duct 12 is ejected through the nozzle 20.

When the pilot valve 40 is opened, the sudden drop in pressure in the chamber 36 causes the piston 26 to return and the seat 22 to come into contact with the plunger 18, thereby closing off communication between the duct 12 and the nozzle 20 (left side of the FIGURE).

The gate is opened and closed directly by drive from the hot gas, thereby enabling rapid and effective switching to be performed without calling on an auxiliary fluid. The control member is acting on a pilot valve and not directly on the main gate, which requires less power and makes it easier to solve the problem of thermally isolating it from the hot gas while using a structure that is more compact.

We claim:

1. A device for controlling a spacecraft by gating gas, said device comprising:

a nozzle having a gate seat integrally formed therewith;

a hot gas feed duct in selective communication with said nozzle;

a plunger constituting with said seat a gate interposed between said hot gas feed duct and said nozzle; and control means including a pilot valve for controlling the opening and the closing of said gate in order to selectively open or close communication between said hot gas feed duct and said nozzle, wherein said nozzle is integrally formed with a movable piston housed in a cylinder and divides the inner volume of the cylinder into a first chamber permanently connected to said hot gas feed duct, and a second chamber in communication with said first chamber and connected to said pilot valve via an exhaust duct opening into the second chamber, wherein said plunger is fixed with respect to said cylinder, and wherein the opening and closing of said gate is caused by hot gas admitted through said hot gas feed duct and acting directly on said piston to move said nozzle away or towards said plunger under the control of said pilot valve.

2. The device according to claim 1, wherein said pilot valve is electromagnetically controlled.

3. The device according to claim 1, wherein said second chamber communicates with said first chamber via a leakage section.

* * * * *